United States Patent [19]

MacInnis et al.

[11] 4,065,413
[45] Dec. 27, 1977

[54] FIRE RESISTANCE WOOD-BASED BOARDS, PROCESS FOR PRODUCING SAME AND COMPOSITIONS USEFUL THEREFOR

[75] Inventors: Martin B. MacInnis, Towanda; L. Rita Quatrini, Athens, both of Pa.

[73] Assignee: GTE Sylvania Incorporated, Stamford, Conn.

[21] Appl. No.: 620,918

[22] Filed: Oct. 8, 1975

[51] Int. Cl.$^2$ .................. C08K 3/32; C08K 5/21
[52] U.S. Cl. .................. 260/9; 260/45.9 NC; 260/45.9 NP; 428/921
[58] Field of Search .............. 260/45.9 NC, 45.9 NP, 260/9; 428/921

[56] References Cited

U.S. PATENT DOCUMENTS

| | | | |
|---|---|---|---|
| 2,097,509 | 11/1937 | Baller | 428/921 X |
| 2,859,187 | 11/1958 | Ropella | 428/921 X |
| 3,383,267 | 5/1968 | Lunden | 260/45.9 NP X |
| 3,398,019 | 8/1968 | Longguth et al. | 428/921 X |
| 3,955,987 | 5/1976 | Schaar et al. | 428/921 |

Primary Examiner—Sandra M. Person
Attorney, Agent, or Firm—Norman J. O'Malley; Donald R. Castle; John C. Fox

[57] ABSTRACT

Aqueous solutions or slurries consisting essentially of water, ammonium hydrogen orthophosphate and urea wherein the amount of urea is from about one-half of the orthophosphate to about equal to the orthophosphate on a molar basis are useful in providing a fire-retardant coating on wood fibers when such fibers and a thermosetting resin are consolidated, under the simultaneous application of heat and pressure, to produce a panel having a density of at least 0.5 grams per cubic centimeter. The useful range of compositions thus contain a P:C atomic ratio of from about 1:1 to about 2:1. Such panels are improved by providing, prior to subjecting the fibers to heat and pressure, intimate contact between the fibers, the orthophosphate and urea composition and providing an amount of composition of at least 10% by weight of the fibers whereby upon the application of heat and pressure a chemical reaction occurs and a wood-based, fire-retardant panel having a Class II flame rating and improved structural properties is produced.

8 Claims, No Drawings

FIRE RESISTANCE WOOD-BASED BOARDS, PROCESS FOR PRODUCING SAME AND COMPOSITIONS USEFUL THEREFOR

BACKGROUND OF THE INVENTION

1. Field of the Invention

This invention relates to the production of fire-retardant hardboard from wood fibers. More particularly, it relates to the use of orthophosphate and urea compositions to render the hardboard fire-retardant.

2. Prior Art

As is discussed in Kirk-Othmer, *Encyclopedia of Chemical Technology*, 2nd edition, Vol. 21, pp. 603–624, there are various types of wallboard. The classifications of organic wallboard are hardboard, particle board, insulating board and plywood. Each of these materials are manufactured by its own distinct processes and each material has its own distinct properties. Wallboard has the highest density and is defined as "a panel manufactured primarily from interfelted lignocellulosic fibers, consolidated under heat and pressure in a hot press to a density of 31 lb./ft.$^3$ or greater." Densities can be as high as 75 lb./ft.$^3$. As is implied from the definition there the simultaneous application of heat and pressure is used. The fibers are bound together by a thermosetting resin. Generally from about 1 to about 2% of the fibers is the amount of resin used. Particle board is manufactured by a pressing under heat, however, larger quantities of resin are used, that is, in the order of from 6 to 10% of the solids. In general, the particle boards are less dense than hardboard and have a much lower modulus of rupture. To prevent moisture absorption the external surfaces are coated with a sizing. Sizing is not used in hardboard manufacture. Insulation board is, as the name implies, used to provide wall and ceiling insulation. It is also manufactured by a technique which uses heat and pressure but varies considerably from the pressures used to manufacture either hardboard or particle board. A slurry containing about 1% of solids comprising solids of wood and various by-products from other industries such as sugar cane residues, the paper industry and the like. In some instances chemical treatment with lime, sodium, hydroxide, and sodium sulfite is used. Much of the water is then drained from the slurry and a pulp is then pressed to form a mat of relatively low density in the order of 15 to 25 lbs./ft.$^3$. The remaining water is then removed by drying and the insulation board is very low density and forms a barrier to the transfer of heat. No resin is used to bind the fibers together. Neither particle board nor hardboard have insulating properties. Insulation board, by its nature, does not have good structural properties. Plywood is not closely related to the other materials since thin layers of wood are melely glued together to form a laminate of the desired thickness.

As can be appreciated, there is a need to provide fire-retardant wallboard. Interest in this area has been increased greatly because the general interest in safety has resulted in more stringent building codes in regard to fire-resistant building materials. Not only does a material have to impart fire-retardancy to the wallboard, it cannot detract from the structural properties nor be more hydroscopic than the untreated wallboard. While many substances will impart fire-retardancy to the wallboards, there is a need for a fire-retardant additive which not only is sufficient to impart fire retardancy but which will enable the other properties of the particular wallboard to remain the same and in the case of where resins are used, the additive must not interfere with the action of the thermosetting resin. Additionally, additives which are suitable for one particular class of wallboard are not at all suitable for other types of wallboard because of the different manufacturing techniques involved, the different material utilized in the process and the differences in the properties between the various types of wallboard.

British Pat. No. 1,242,290 published Aug. 11, 1971 discloses a fire-resistant wood-based board similar to a hardboard which includes a fire-retardant agent in the form of granules having a mean diameter not exceeding 2mm and provided with an inert moisture resistant coating which may contain oleophillic substances to an extent not exceeding 8% by weight of the granules. The inorganic retardant is encapsulated so that the water solubility and the diffusion ability in the board are reduced. Suggested fire retardants in the form of granules are ammonium nitrates in combination with ammonium phosphates, an ammonium nitrate-diammonium hydrogen phosphate-potassium phosphate mixture; diammonium hydrogen phosphate; a diammonium hydrogen phosphate-urea composition and a boric acid-borax composition. The moisture resistant coatings suggested are talc-fatty acid derivatives and oil; gypsum and silicones; silica gel-stearate and naphthenates; silica gel-stearates — fatty amines and oil and silica gel — stearates and paraffin wax. The patent clearly teaches that the moisture resistant layer is essential to provide a board which is both moisture resistant and fire retardant. Additionally, the fire-retardant composition is provided as a distinct layer of granules between layers of the wood fibers.

U.S. Pat. No. 3,398,019 relates to insulating wallboard in the form of insulation tiles made from wood products. In the production of the insulation board the wood products are slurried in water and have a solids content in the slurry of about 1% by weight. The water is drained from the solids which are then pressed to form a sheet having a density of from about 0.16 grams/cc to about 0.4 grams/cc. The sheets are then dried at oven temperatures of 270° to 500° F. When the ammonium phosphates are used as fire retardants, the wood insulation tiles discolor due to the decomposition of the ammonium phosphates. Urea is suggested as a decomposition inhibitor for the ammonium phosphate because the temperature used in drying the panels is above the decomposition temperature of the monammonium phosphate, one of the suggested phosphates. Data is given only for monammonium dihydrogen phosphate-urea compositions to prevent discoloration. The urea and phosphates are disclosed as being capable of being added as solids or as solutions. Urea is disclosed as having a tendency to draw moisture to the product and large amounts are to be avoided. Borax and boric acid as well as the phosphates are disclosed in Kirk-Othmer, supra, as imparting fire resistance to insulation board.

It is believed, therefore, that an additive which can be added during the manufacture of hardboard which not only imparts fire retardancy but also does not interfere with the resin and does not detract from the structural characteristics of the hardboard would be an advancement in the art.

OBJECTS AND SUMMARY OF THE INVENTION

It is an object of the invention to provide a material capable of imparting fire retardancy to hardboard.

It is an additional object of this invention to provide an improvement to the process of producing hardboard.

It is a further object of this invention to provide a fire retardant hardboard without the use of barrier layers.

It is still another object of this invention to provide a hardboard having improved properties.

These and other objects of this invention are achieved in one aspect of the invention by an aqueous mixture of water, diammonium hydrogen orthophosphate and urea wherein the P:C ratio is from about 1:1 to about 2:1.

In an additional aspect of this invention the process wherein wood fibers containing from about 6 to about 8% by weight of water and from about 1 to about 2% of a thermosetting resin are consolidated by the simultaneous application of heat and pressure to a density of at least 0.5 gram/cc is improved by providing intimate contact between the fibers and at least about 10% of the fiber weight of a mixture of ammonium phosphate and urea having a P:C atomic ratio of from about 1:1 to about 2:1 whereby upon the simultaneous application of heat and pressure under specified condition a chemical reaction occurs and a hardboard panel having a Class II flame rating and improved structural properties is produced.

For a better understanding of the present invention, together with other and further objects, advantages and capabilities thereof, reference is made to the following disclosure and appended claims in connection with the above description of some of the aspects of the invention.

DETAILS OF THE PREFERRED EMBODIMENT

There are a vast number of chemical compounds and compositions which have been reported to have some degree of fire retardancy. To screen the materials for potential use in hardboard it is useful to provide a simple test for determining if a material has merit for further testing. A procedure useful in the screening of material comprises treating the fibers in a predetermined sample of a mixture of about 2% by weight of a thermosetting resin, such as phenol formaldehyde, about 6% by weight of water, about 2% by weight of petrolatum (which is a paraffinic product used as a pressing aid in the formation of hardboard) and the balance wood fibers with a predetermined and sufficient amount of an aqueous solution of slurry of the chemical to provide 30% of the weight of the fibers of the chemical to be screened. After treatment the wetted fibers are dried to remove excess water. After drying the fibers are placed in a flame at about 800° to 1000° C for a predetermined period of time, generally about 5 seconds. A rating system dependent upon the degree that the fibers continued to burn when removed from the flame is as follows:

F-1 — Burns when flame is removed
F-2 — Brief residual flame about 10 seconds
F-3 — Very brief residual flame less than 10 seconds
F-4 — Non-residual flame but after glow
F-5 — No flame, no afterglow, only charring.

It is felt that for chemical to be an effective candidate as a fire retardant for hardboard a material must yield an F-5 rating. Materials which have been found which the literature indicates have some degree of fire retardancy for certain purposes but did not have an F-5 rating include sodium silicate, aluminum silicate, alumina, vermiculite, molybdenum tri-oxide, zinc borate, low melting glasses of the $Li_2CO_3$, $Na_2CO_3$, $K_2CO_3$, ammonium phosphate, phosphoric acid, zinc oxide and sodium fluoride type.

Compounds tested above that had an F-5 rating include boric acid, and diammonium phosphate. Compositions or mixtures of boric acid and urea; boric acid and sodium borate (borax); calcium chloride and diammonium phosphate; ammonium polyphosphate and urea; diammonium phosphate and urea; calcium acetate and sodium borate; boric acid, sodium borate and urea; calcium chloride, boric acid, sodium borate and urea; diammonium phosphate, silica gel and zinc stearate; boric acid, borax, urea and $H_2SO_4$; diammonium phosphate, potassium chloride, calcium sulfate and zinc stearate; and boric acid, borax, urea and zinc stearate when tested as above gave an F-5 rating. From the original tests, observations on the fibers and subsequent additional tests, the following compositions are determined to have the best potential for incorporating into hardboard manufacture. The compositions are given in Table I below.

TABLE I

| Composition | Components (By Weight Percent) |
| --- | --- |
| 1. | 26% $H_3BO_3$, 48% Borax, 26% Urea |
| 2. | 39.4% $H_3BO_3$, 33.1% Borax, 27.5 Urea |
| 3. | 24.7% $H_3BO_3$, 45.7% Borax, 24,7% Urea, 4.9% $H_2SO_4$ |
| 4. | 67.6% $(NH_4)_2 HPO_4$, 15.8% KCl, 8.3% $CaSO_4$, 8.3% Zinc Stearate |
| 5. | 75% $(NH_4)_2HPO_4$, 25% Urea |
| 6. | 23.8% $H_3BO_3$, 44.1 Borax, 23.8% Urea + 8.3% zinc stearate |

Upon incorporating composition 1 into hardboard manufacture several problems result. In addition to the evolution of ammonia thus indicating a chemical reaction upon the simultaneous application of heat and pressure, board surfaces degrade and pronounced swelling of the hardboard occurs when the board is soaked in water. Compositions 2 and 3, having lower pH, do not solve the water swelling problem although the high pH materials are generally thought to contribute to such problems. The use of zinc stearate, a hydrophobic material, as a moisture resistant coating does not solve the water swelling problem.

The lack of resistance to water is believed to be associated with the interference of the polymerization action of the resin. Tests with Composition 1 above and each of its components indicate that the composition and each of its components interfere with the normal polymerization of the resin because a partially water-soluble product is formed upon heating the resin in the presence of Composition 1 and each of its components. Heating of the resin alone yields a water insoluble product.

When Composition 4 was tested the water swelling problem occurred. Only Composition 5 resulted in a usable hardboard.

Further test results using Composition 5 indicate that the hardboard modulus of rupture is equal to or better than hardboard without the additive. The density of the board is essentially unchanged and less water is absorbed than with a board not containing Composition 5. A burn index equivalent to a Class II board is achieved in a 7 ft. tunnel test. From about 10 to about 20 weight percent of Composition 5 imparts fire retardancy and from about 15 to about 20 weight percent is preferred.

The above experiments indicate that composition containing an ammonium hydrogen phosphate salt and urea having a P:C atomic ratio of from about 1:1 to about 2:1 with ratio of from about 1.2:1 to about 1.5:1 being preferred can be used to impart fire retardancy to hardboard without sacrificing any of the other properties. It is believed to be surprising that the polymerization action of the resin is not interfered with because composition 4 contained diammonium hydrogen orthophosphate and it interferred with the polymerization action and absorbed water and urea definitely did affect the polymerization action. Thus, it has been found that when an ammonium hydrogen orthophosphate salt and urea mixture wherein the P:C atomic ratio is from about 1:1 to about 2:1 is placed in intimate contact with wood fibers and a thermosetting resin and subsequent heat and pressure are applied to the fibers, the fibers are rendered fire-retardant and the polymerization action of the resin is not inhibited. Furthermore, photomicrographs indicate that the fibers are fully coated with the fire-retardant. Evolution of ammonium during the application of heat and pressure show that a chemical reaction occurs. A thermal condensation reaction may be occurring which results in the evolution of carbon dioxide, ammonia, water vapor and the formation of a longer chain ammonium phosphate although the above theory is not known as fact.

The fire-retardant hardboard is known to contain ammonia and from about 3 to about 8% weight percent of phosphorus as fire-retardant additive in the form of a phosphate, can achieve a Class II rating, has good water resistance and good structural properties. The fibers retain a coating of the fire-retardant additives as determined by microscopic analysis in the form of photomicrographs.

In the following example a water solution of diammonium orthophosphate and urea is given. It is preferred to use aqueous solutions or slurries containing from about 10 to 90% by weight of an ammonium hydrogen phosphate salt and urea with 25 to 75% by weight being preferred and with diammonium orthophosphate being the preferred salt. Other methods of providing intimate contact between the fibers, the ammonium phosphates and urea will readily be apparent to those skilled in the art, such as the use of other suspension media or solvents, providing a melt of the raw materials and the like. In these examples which are presented to more fully illustrate the invention, the parts and percentages and proportions are by weight unless otherwise indicated.

EXAMPLE I

To about 2,000 parts of water, about 1,000 parts of diammonium phosphate and about 334 parts of urea are added. The solution is thereafter sprayed in a uniform fashion upon about 8,898 parts of a wood fiber mixture containing about 8% by weight of water, about 2% by weight of phenolformaldehyde resin and about 2% by weight of petrolatum. The fibers are dried to about 8% by weight of water and pressed in a conventional manner until temperature at the center of the panel indicates about 205° C. Tests of the panel thus produced indicates that the board swells only 4.7% as compared to 11.4% with a panel containing no fire retardant. The gain in weight after 1 hour when soaked in water indicates a gain of about 2.4% water whereas a board manufactured in similar fashion without the fire-retardant indicates about 4.1% water absorption. The flame spread classification is a measure of the surface burning characteristics of a building material when compared to the relative surface burning characteristics of asbestos cement board (rated at 0) and untreated select Red Oak flooring (rated at 100). The classification or rating for Class II board is between 25 and 75 and this example has a Class II rating. The modulus of rupture is equivalent to that of the board without the fire retardant.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for preparing a fire resistant wall board comprising forming a mixture of wood fibers with about 1% to about 2% by weight of said fibers of a thermosetting resin and about 10% to about 20% by weight of said fibers of a fire retardant composition consisting essentially of an ammonium hydrogen phosphate salt and urea having a P:C atomic ratio of from about 1:1 to about 2:1 and thereafter consolidating said mixture by the simultaneous application of heat and pressure to form a wood-like panel having a density of greater than 0.5 grams/cc.

2. The process of claim 1 wherein said wood fibers have a moisture content of from about 6% to about 8% by weight and said mixture additionally includes from about 1% to about 2% of a paraffinic pressing aid.

3. The process of claim 1 wherein intimate contact is provided between said fibers and said fire retardant composition by spraying a solution or slurry of said fire retardant composition in a solvent or suspension media upon said fibers and removing a sufficient amount of said solvent or suspension media to achieve a residual water content of from about 6 to about 8% prior to consolidation.

4. The process of claim 1 wherein said intimate contact is provided by an aqueous solution of said fire retardant composition.

5. The process of claim 4 wherein said phosphate salt is diammonium hydrogen orthophosphate.

6. The process of claim 5 wherein said P:C ratio is from about 1.2:1 to 1.5:1.

7. The process of claim 6 wherein said aqueous solution has a salt and urea content of from about 25 to 75% by weight.

8. A process according to claim 4 wherein said fire retardant is from about 15 to about 20% by weight of said fibers.

* * * * *

UNITED STATES PATENT OFFICE
CERTIFICATE OF CORRECTION

Patent No. 4,065,413  Dated December 27, 1977

Inventor(s) Martin B. MacInnis et al.

It is certified that error appears in the above-identified patent and that said Letters Patent are hereby corrected as shown below:

Column 5, line 26, "ammonium" should read -- ammonia --.

Signed and Sealed this

Third Day of October 1978

[SEAL]

Attest:

RUTH C. MASON
Attesting Officer

DONALD W. BANNER
Commissioner of Patents and Trademarks